No. 631,727. Patented Aug. 22, 1899.
G. H. LEWIS.
BICYCLE TIRE.
(Application filed Nov. 22, 1898.)
(No Model.)
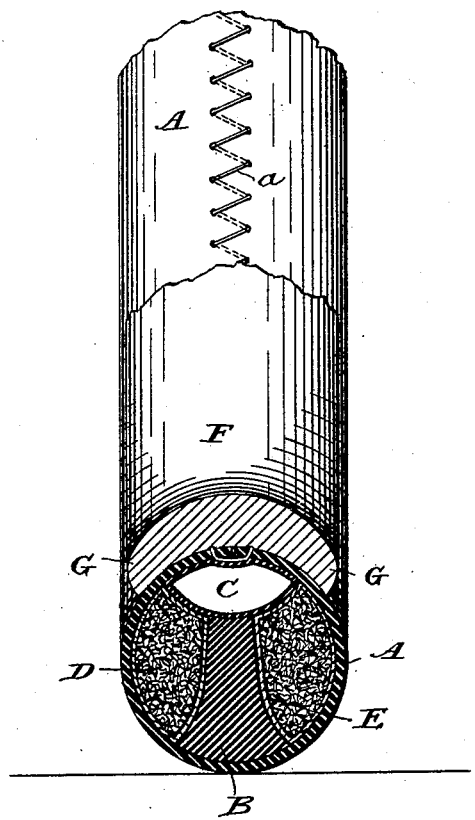
WITNESSES:
INVENTOR
George Harris Lewis
BY
ATTORNEYS

UNITED STATES PATENT OFFICE.

GEORGE HARRIS LEWIS, OF GALVESTON, TEXAS, ASSIGNOR OF THREE-FOURTHS TO JOSEPH A. LABATT, JOHN GOGGAN, LEON BLUM, AND HENRY J. LABATT, OF SAME PLACE.

BICYCLE-TIRE.

SPECIFICATION forming part of Letters Patent No. 631,727, dated August 22, 1899.

Application filed November 22, 1898. Serial No. 697,156. (No model.)

*To all whom it may concern:*

Be it known that I, GEORGE HARRIS LEWIS, a citizen of the United States, and a resident of Galveston, State of Texas, have invented certain new and useful Improvements in Tires, of which the following is a full, clear, and exact specification.

My invention relates to an improved construction of tires particularly applicable for use with bicycles, whereby I produce a light, elastic, and resilient tire not liable to be punctured, and which, if punctured, will not suffer material injury, my tire being so constructed that the object which has punctured it can be withdrawn without any perceptible damage ensuing. My tire can also be advantageously used for riding on all kinds of roads, it being capable of such adjustment as to make it fit for comfortable riding on rough and rocky roads as well as on smooth and hard roads.

To the ends above mentioned my invention consists, essentially, in providing an elastic outer tube or covering of any suitable material—such, for example, as rubber—and forming an integral part of such outer tube a solid wedge-shaped piece of rubber or other elastic material, which is placed on the inner surface of that part of the tire forming the tread and which extends centrally through the tire to an elastic pneumatic tube, also within the tire, which tube is attached to the part of the tire lying next the rim of the wheel. On both sides of the wedge-shaped piece of rubber I insert a filling of horsehair or other springy material contained within any suitable covering of fabric, preferably bags or tubes of canvas.

Referring to the accompanying drawing, forming part of this specification, and in which like letters of reference indicate similar parts throughout, I have shown my improved tire partly in plan and partly in cross-section.

A represents the outer tube or covering, of rubber or equivalent material, inclosing the wedge-shaped piece of solid rubber B, the pneumatic tube C, and the filling of horsehair or the like D within a covering of canvas E.

The outer tube A may be made in the usual manner by molding; but I have found in practice that better results are obtained if the ends of the tube are drawn together by lacings, such as shown in the drawing at a.

The wedge-shaped piece of solid rubber B may be made as a part of the outer tire A, or it may be separately molded and then properly secured to the tube. I prefer to make both parts together in one piece. In riding pressure is brought to bear on the tread of the tire, and the piece of rubber B is pressed upon and forced against the pneumatic air-inflation tube C, thus producing elasticity and resiliency, breaking the force of impact should the wheel strike an obstruction in the road and very materially lessening the jar caused in riding over rough or broken roads. The piece of rubber B also retains the tire in its normal position and prevents it from collapsing, as is the result when a pneumatic air-inflated tire is used and punctured and the air permitted to escape therefrom.

The action of the tread on the wedge-shaped piece of rubber B is such as to force the rubber against the pneumatic tube C. This action is entirely free from and independent of any action of the horsehair-filled tubes E. These parts, working independent of each other, permit of free downward action of the piece of rubber, while the tube E remains substantially stationary. The tubes E, filled with horsehair or like material D, being placed on both sides of the piece B and within the tube A, add to the resiliency of the tire and form a protection against punctures from objects lying in the road. The horsehair D being uniformly disposed throughout the entire length of the tubes E within which it is contained the outer surface of the tube A is perfectly even and free from imperfections.

The pneumatic tube C is placed within the outer tube A and next the rim F of the wheel. The tube C may be inflated or deflated by means of the ordinary appliances now in use for such purpose. The tube C is of such size that when the tire is attached to the wheel the sides G G of the rim F will extend down over that part of the outer tube A containing the pneumatic tube C and form a protection against puncture to the latter.

When rough roads are encountered, the rider may cause his tire to become soft, and they make riding easier, by deflating the pneumatic tire C, and when a hard tire is desired the pneumatic tube C may be again inflated, it being possible to introduce the desired amount of air by means of an air-pump or the like.

With my improved construction I produce a tire possessing all the advantages of a pneumatic tire and being free from many of its defects. A great drawback to the use of pneumatic tires has been their liability to being punctured on the road. In the use of my tire this cannot occur at all. The parts which are unprotected are so constructed as not to be injured or seriously affected by any sharp object entering into or penetrating them.

By the combined use of tubings filled with horsehair and the pneumatic tube C, I obtain a degree of resiliency exceeding that obtainable in the use of ordinary pneumatic tires. My improved tire is also cheaper and more easily constructed and adjusted than a pneumatic tire.

In carrying my invention into practice I place the tubes E, filled with horsehair, in both sides of the solid rubber piece B, and then on top of the piece B and resting thereon and on the tubes E, I place the tube C in its proper position. The two ends of the tube A are then drawn together and secured by lacing or in any other suitable manner.

Having thus described my invention, what I claim, and desire to secure by Letters Patent, is—

1. A tire, comprising an outer elastic tube, a piece of solid rubber centrally integral therewith, a filling of springy material and a pneumatic tube resting on said filling and solid piece of rubber substantially as described.

2. A bicycle-tire formed of an outer elastic tube, a wedge-shaped piece of solid rubber extending within said outer tube and integral therewith, a filling of springy material contained within fabric tubes and a pneumatic tube resting on the end of the said piece of solid rubber substantially as described.

3. In a bicycle-tire the combination with an outer elastic tube, of a wedge-shaped piece of solid rubber—rubber integral therewith, a filling of canvas on both sides of said solid piece of rubber and a pneumatic tube within said outer elastic tube substantially as described.

4. In a bicycle-tire the combination with the tube A, of the piece of rubber B integral therewith, the pneumatic tube C, fabric tubes E containing fillings of horsehair and means for securing together the edges of said tube A substantially as described.

In witness whereof I have hereunto set my hand in presence of two witnesses.

GEORGE HARRIS LEWIS.

Witnesses:
H. L. BEIL,
OTTO MINCK.